US008839187B1

(12) United States Patent
Yan

(10) Patent No.: US 8,839,187 B1
(45) Date of Patent: Sep. 16, 2014

(54) AUTOMATIC GENERATION OF HARDWARE SIMULATION INTERFACE CODE USING PRE-PROCESSOR MACROS

(75) Inventor: Ying-On Yan, Lexington, MA (US)

(73) Assignee: The Mathworks, Inc., Natick, MA (US)

( * ) Notice: Subject to any disclaimer, the term of this patent is extended or adjusted under 35 U.S.C. 154(b) by 955 days.

(21) Appl. No.: 12/625,000

(22) Filed: Nov. 24, 2009

Related U.S. Application Data

(60) Provisional application No. 61/153,183, filed on Feb. 17, 2009.

(51) Int. Cl.
*G06F 9/44* (2006.01)
*G06F 9/45* (2006.01)

(52) U.S. Cl.
USPC ............ 717/104; 717/105; 717/106; 717/140

(58) Field of Classification Search
None
See application file for complete search history.

(56) References Cited

U.S. PATENT DOCUMENTS

2004/0148151 A1* 7/2004 Menter et al. ................. 717/135

* cited by examiner

*Primary Examiner* — Qamrun Nahar
(74) *Attorney, Agent, or Firm* — Harrity & Harrity, LLP

(57) ABSTRACT

A memory map wrapper may be used to provide an interface between a model and a system with which the model interacts. The memory map wrapper may be designed to provide an interface for source code implementing the model. The memory-map wrapper may include a source code section that describes a mapping between memory regions corresponding to first and second sets of signals and between the source code implementing the model, the mapping defined using macros in memory map wrapper code in which configuration information describing the first and second signals is provided as one or more parameters associated with the source code section. Additionally, a preprocessor component may expand the macros in the memory map wrapper code based on the provided one or more parameters to output expanded memory map wrapper code.

30 Claims, 6 Drawing Sheets

AUTOMATIC GENERATION OF HARDWARE SIMULATION INTERFACE CODE USING PRE-PROCESSOR MACROS

RELATED APPLICATION

This application claims priority to U.S. Provisional Patent Application No. 61/153,183, filed Feb. 17, 2009, the disclosure of which is incorporated by reference herein.

BACKGROUND

Technical computing environments are known that present a user, such as a scientist or engineer, with an environment that enables efficient analysis and generation of technical applications. For example, users may perform analyses, visualize data, and develop algorithms. Technical computing environments may allow a technical researcher or designer to efficiently and quickly perform tasks, such as research and product development.

Existing technical computing environments may be implemented as, or run in conjunction with, a graphically-based modeling environment. For example, in one existing graphically-based modeling environment, graphical simulation tools allow models to be built by connecting graphical blocks, where each block may represent an object associated with functionality and/or data. The technical computing environment and the graphically-based modeling environment may be a single, integrated application. Alternatively, the two may in some way be combined or linked with one another to present a graphical interface to the user.

Models generated with graphical modeling tools may, at some point, be implemented in a target environment. For example, the model may be converted to a specification for a hardware design or converted to a representation in a programming language, such as C++.

In some situations, a model that is intended for final implementation as a hardware design may be initially converted to computer code for testing and verification of the model during interaction with the larger system in which the model is to be used. For example, a company may create a model that implements a particular set of signal processing algorithms. The intended final target for the model may be as a portion of a semiconductor chip. In order to verify the model's interaction with the rest of the semiconductor chip, the company may wish to first convert the model to computer code that can be executed on a general purpose computer to simulate the final hardware circuit. The simulation may interact with the larger hardware or software system in which the model is to be used.

Tools are known to automatically convert models to computer code that can be simulated. However, in order to simulate the interaction of the model with the larger system, the designer may still be required to write custom interface code that provides an interface between the simulation of the model and the implementation of the larger system. Manually writing and maintaining the custom interface code can be a time consuming process for the developer.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

Figure 1:
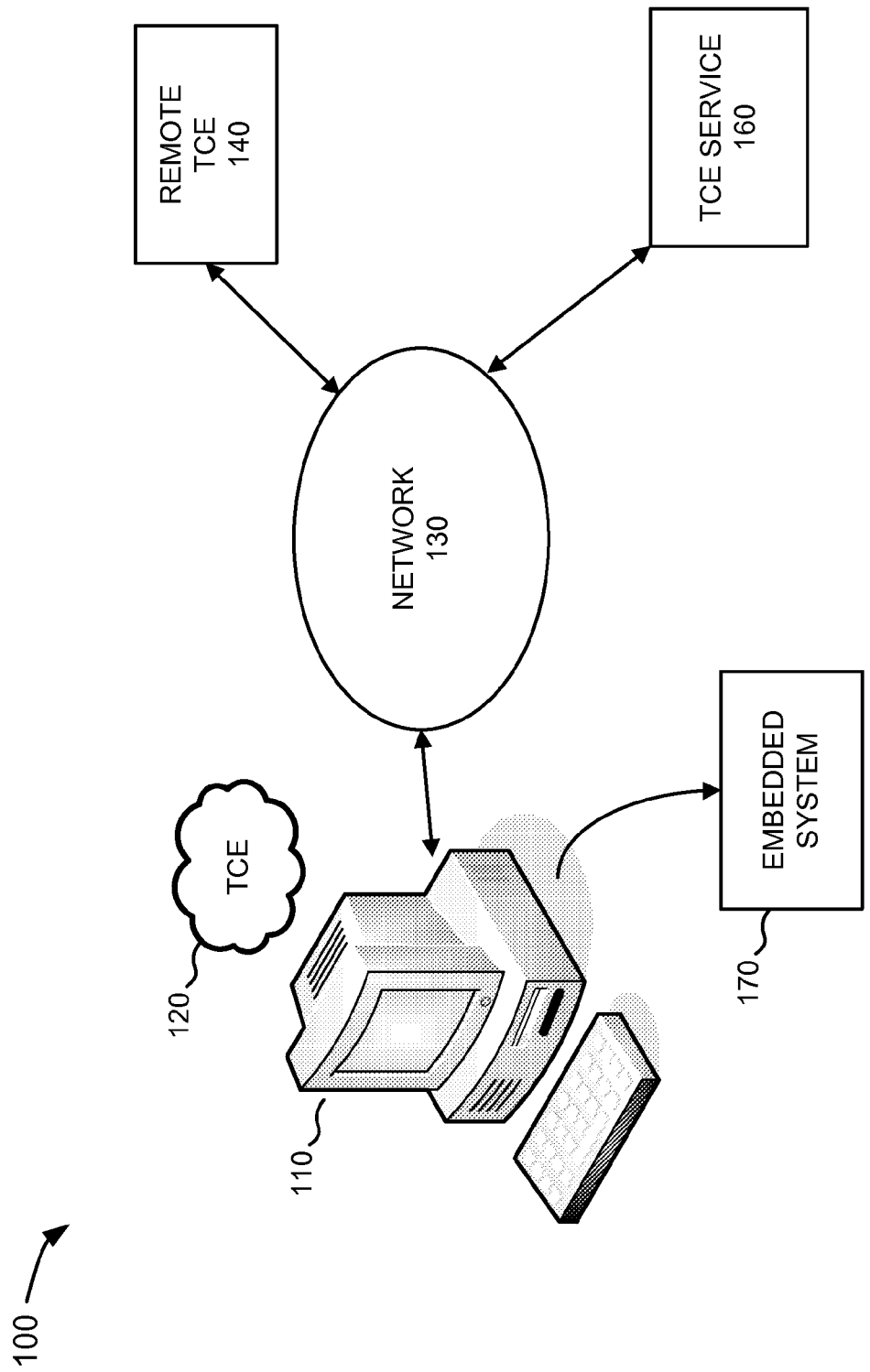
FIG. 1 is an exemplary diagram of a system in which concepts described herein may be implemented.

The following detailed description refers to the accompanying drawings. The same reference numbers in different drawings may identify the same or similar elements. Also, the following detailed description does not limit the invention.

Implementations described herein relate to the generation of a memory map interface between a model and a system with which the model interacts. The memory map interface may generally function to map signals (and operations on the signals) between the model and the system with which the model interacts. Computer code for the memory map interface may be written using a macro language designed to assist in defining the number of signals, the type of the signals, and/or operations that are to be performed for the signals. A preprocessor component may expand the memory map interface code based on the macro language.

DEFINITIONS

A Technical Computing Environment (TCE) may include any hardware and/or software based logic that provides a computing environment that allows users to perform tasks related to disciplines, such as, but not limited to, mathematics, science, engineering, medicine, and business. The TCE may include text-based facilities (e.g., MATLAB® software), a graphically-based environment (e.g., Simulink® software, Stateflow® software, SimEvents™ software, etc., by The MathWorks, Inc.; VisSim by Visual Solutions; LabView® by National Instruments), or another type of environment, such as a hybrid environment that includes one or more of the above-referenced text-based environments and one or more of the above-referenced graphically-based environments.

The TCE may be integrated with or operate in conjunction with a graphical modeling environment (e.g., Simulink®, mentioned above), which may provide graphical tools for constructing models or systems or processes. The TCE may include additional tools, such as tools designed to convert a model into an alternate representation, such as source computer code, compiled computer code, or a hardware description (e.g., a description of a circuit layout). In one implementation, the TCE may provide this ability using graphical toolboxes (e.g., toolboxes for signal processing, image processing, data plotting, parallel processing, etc.). In another implementation, the TCE may provide these functions as block sets. In still another implementation, the TCE may provide these functions in another way.

Models generated with the TCE may be, for example, models of a physical system, computing system, engineered system, embedded system, biological system, chemical system, etc.

As previously mentioned, an exemplary embodiment of the TCE may use one or more text-based products, such as textual modeling environments. For example, a text-based modeling environment, may be implemented using products such as, but not limited to, MATLAB® by The MathWorks, Inc.; Octave; Python; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; or Modelica or Dymola from Dynasim. In some embodiments, the text-based modeling environment may include hardware and/or software based logic that provides a computing environment that allows users to perform tasks related to disciplines, such as, but not limited to, mathematics, science, engineering, medicine, business, etc., more efficiently than if the tasks were performed in another type of computing environment, such as an environment that required the user to develop code in a conventional programming language, such as C++, C, Fortran, Pascal, etc.

In one implementation, the text-based modeling environment can include a dynamically typed language that can be used to express problems and/or solutions in mathematical notations familiar to those of skill in the relevant arts. For example, the modeling environment may use an array as a basic element, where the array may not require dimensioning. These arrays may be used to support array programming in that operations can apply to an entire set of values, such as values in an array. Array programming may allow array based operations to be treated as a high-level programming technique or model that lets a programmer think and operate on whole aggregations of data without having to resort to explicit loops of individual non-array, i.e., scalar operations.

The modeling environment may further be adapted to perform matrix and/or vector formulations that can be used for data analysis, data visualization, application development, simulation, modeling, algorithm development, etc. These matrix and/or vector formulations may be used in many areas, such as statistics, finance, image processing, signal processing, control design, life sciences, education, discrete event analysis and/or design, state based analysis and/or design, etc.

In another exemplary embodiment, the TCE may implement in a graphically-based modeling environment using products such as, but not limited to, Simulink®, Stateflow®, SimEvents™, etc., by The MathWorks, Inc.; VisSim by Visual Solutions; LabView® by National Instruments; Dymola by Dynasim; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhopsody or Tau from Telelogic; Ptolemy from the University of California at Berkeley; or aspects of a Unified Modeling Language (UML) or SysML environment.

System Description

FIG. 1 is an exemplary diagram of a system 100 in which concepts described herein may be implemented. System 100 may include a personal computer or workstation 110. Workstation 110 may execute a technical computing environment (TCE) 120 that presents a user with an interface that enables design, analysis, and generation of, for example, technical applications, engineered systems, and business applications. For example, TCE 120 may provide a numerical and/or symbolic computing environment that allows for matrix manipulation, plotting of functions and data, implementation of algorithms, creation of user interfaces, and/or interfacing with programs in other languages. TCE 120 may particularly include a graphical modeling component and a component to convert graphic models into other forms, such as computer source code (e.g., C++ code) or hardware descriptions (e.g., a description of an electronic circuit).

Workstation 110 may operate as a single detached computing device. Alternatively, workstation 110 may be connected to a network 130, such as a local area network (LAN) or a wide area network (WAN), such as the Internet. When workstation 110 is connected to a network, TCE 120 may be run by multiple networked computing devices or by one or more remote computing devices. In such an implementation, TCE 120 may be executed in a distributed manner, such as by executing on multiple computing devices simultaneously. Additionally, in some implementations, TCE 120 may be executed over network 130 in a client-server relationship. For example, workstation 110 may act as a client that communicates with, using a web browser, a server that stores and potentially executes the graphical modeling environment program.

For example, as shown in FIG. 1, system 100 may include a remote TCE 140 (e.g., a remotely located computing device running a TCE) and/or a TCE service 160. TCE service 160 may include a server computing device that provides a TCE as a remote service. For instance, a TCE may be provided as a web service. The web service may provide access to one or more programs provided by TCE service 160.

In some implementations, users of TCE 120 (or remote TCE 140 or TCE service 160) may use TCE 120 to design models that are to be implemented in or interact with an external device, such as embedded system 170. Embedded system 170 may be a device that includes a number of components. Assume one of the components for embedded system 170, such as hardware that implements a signal processing algorithm, is modeled using TCE 120. During testing of the model on workstation 110, embedded system 170 may be connected to workstation 110. The model may then be simulated on workstation 110 by converting the model to an executable program and running the executable program, which may respond to signals from and transmit signals to the other components of embedded system 170.

Figure 2:
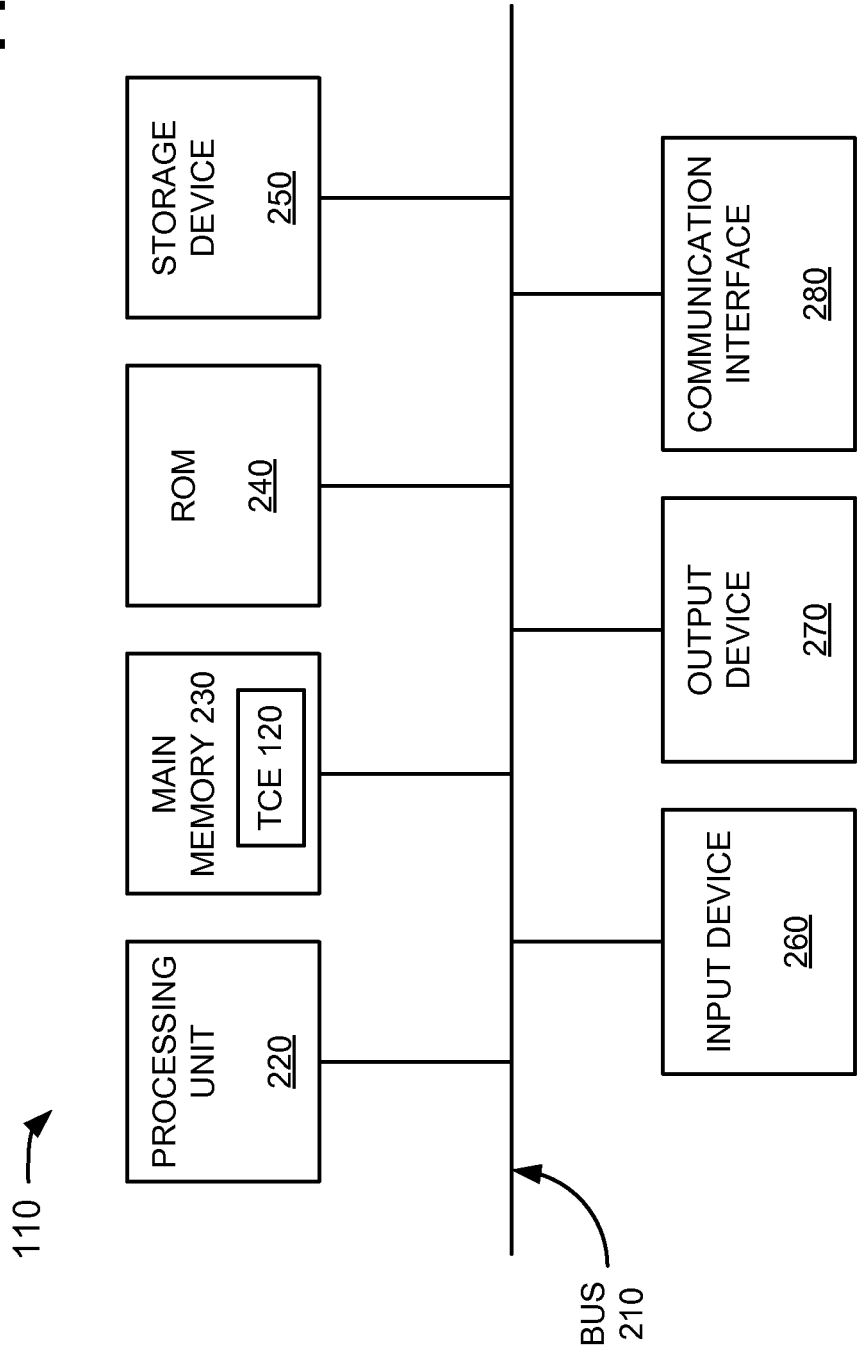
FIG. 2 is a diagram of an exemplary device corresponding to a computing device shown in FIG. 1.

FIG. 2 is a diagram of an exemplary device corresponding to workstation 110 or a remote device running remote TCE 140 or TCE service 160. As illustrated, workstation 110 may include a bus 210, a processing unit 220, a main memory 230, a read-only memory (ROM) 240, a storage device 250, an input device 260, an output device 270, and/or a communication interface 280. Bus 210 may include a path that permits communication among the components of workstation 110.

Processing unit 220 may include a processor, multiple processors, microprocessor, or other types of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive. In some implementations, main memory 230 or storage device 250 may also be implemented as solid state memory, such as flash-based memory.

Input device 260 may include a mechanism that permits an operator to input information to workstation 110, such as a keyboard, a mouse, a pen, a single or multi-point touch interface, an accelerometer, a gyroscope, a microphone, voice recognition and/or biometric mechanisms, etc. Output device 270 may include a mechanism that outputs information to the operator, including a display, a printer, a speaker, etc. In the case of a display, the display may be a touch screen display that acts as both an input and an output device. Input device and/or output device 270 may be haptic type devices, such as joysticks or other devices based on touch.

Communication interface 280 may include any transceiver-like mechanism that enables workstation 110 to communicate with other devices and/or systems. For example, communication interface 280 may include mechanisms for communicating with another device or system via a network.

As will be described in detail below, workstation 110 may perform certain operations in response to processing unit 220 executing software instructions contained in a computer-readable medium, such as main memory 230. For instance, workstation 110 may implement TCE 120 by executing software instructions from main memory 230. A computer-readable medium may be defined as a physical or logical memory device, where the logical memory device may include a number of physically, possible physically distributed, memory devices. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Although FIG. 2 shows exemplary components of workstation 110, in other implementations, workstation 110 may contain fewer, different, or additional components than depicted in FIG. 2. In some implementations, one or more components of workstation 110 may perform one or more tasks described as being performed by one or more other components of workstation 110.

Memory Map Interface

Figure 3:
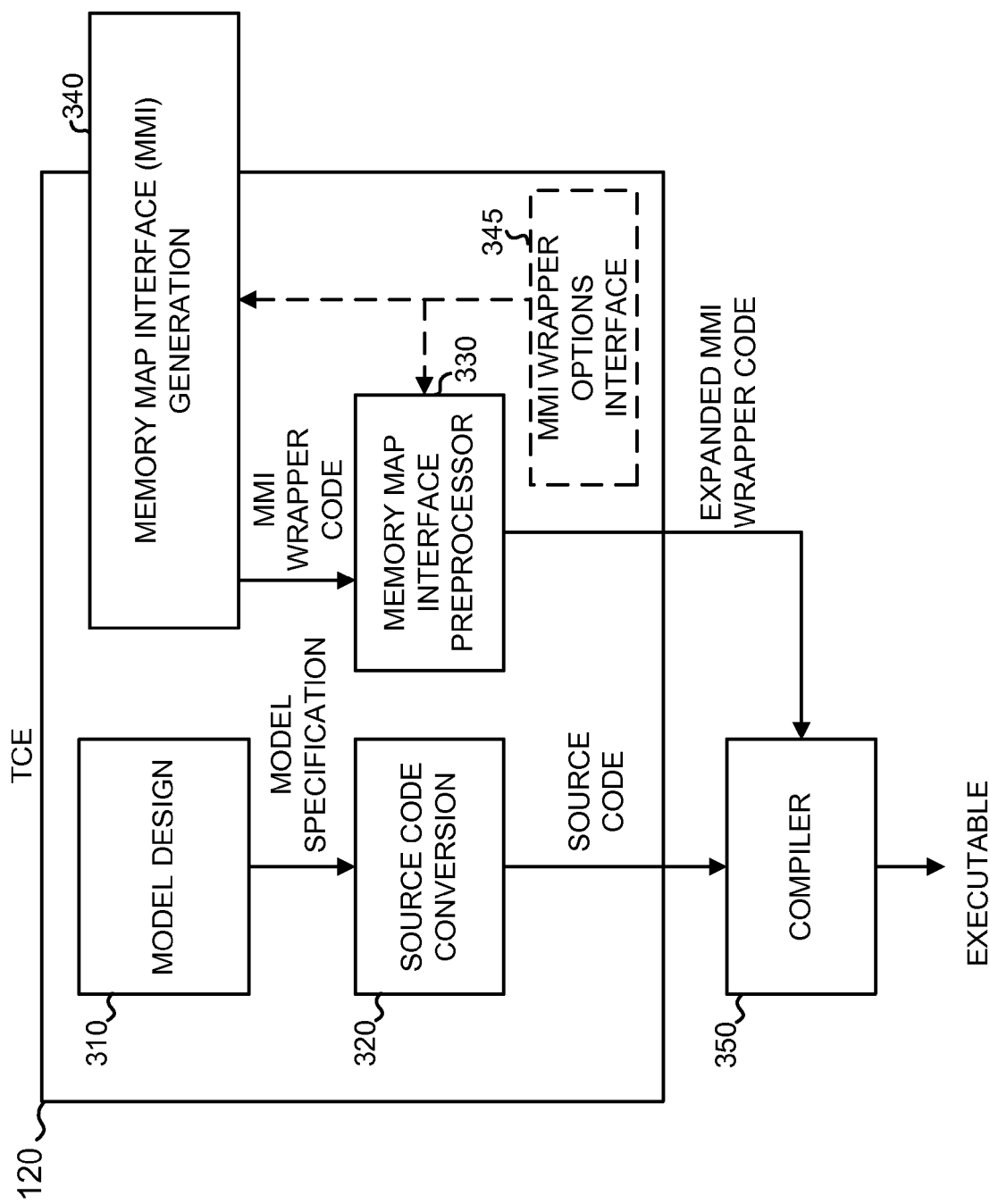
FIG. 3 is a diagram illustrating functional components of a technical computing environment in generating code that may be used to test or verify the operation of a model.

FIG. 3 is a diagram illustrating functional components of TCE 120 in generating code that may be used to test or verify the operation of a model and/or the interaction of the model with an external system. As shown, TCE 120 may include a model design component 310, a source code generation component 320, and a memory map interface (MMI) preprocessor 330. Additionally, in some implementations, TCE 120 may include an MMI generation component 340 that may automatically generate MMI code based on, for example, user entered parameters. In other implementations, the operations performed by MMI generation component 340 may be performed manually or semi-manually by a user to generate the MMI code. A compiler 350 may compile source code generated by TCE 120. Executable code may be output by compiler 350 and used to implement the simulation of the model.

User entered parameters to control MMI generation component 340, and potentially also to control MMI preprocessor 330, may be input through a graphical interface, labeled as MMI wrapper options interface 345 in FIG. 3. In some implementations, MMI wrapper options interface 345 may not be present and the user entered parameters may be entered manually, such as by modifying text files.

Model design component 310 may include software for creating and simulating models for dynamic and embedded systems. Model design component 310 may include an interactive graphical environment through which a user may create models. For example, customizable graphical block libraries may be provided, where each block in the graphical library may represent a particular function, signal source, or signal sink. Users of TCE 120 may, in general, use model design component 310 to design algorithms that are intended to be implemented in hardware, such as a component of embedded system 170. One example of a known model design component is the Simulink® software environment, by The MathWorks, Inc.

Model design component 310 may save or output created models as a model specification, such as a file or other data structure that describes the designed model. Source code generation component 320 may convert the model specification into source code that implements the functionality of the model. For example, source code generation component 320 may output C or C++ code corresponding to the model. One example of a known source code generator is the Real-Time Workshop® software, by The MathWorks, Inc.

Memory map interface (MMI) generation component 340 may facilitate the generation of a memory map interface that may be used to test or verify the functionality of a model as the model interacts with an external system. The MMI may act as an interface through which the model may communicate with an external system, such as external hardware or an external software test suite. In one implementation, the MMI may implement a "wrapper" (herein "MMI wrapper") that provides an interface between the code corresponding to the model and the external system.

In some implementations, MMI generation component 340 may automatically generate MMI wrapper code based on parameters supplied by a user. In other implementations, MMI component 340 may provide a number of possible MMI wrapper code examples from which a user may choose. The user may then modify the chosen wrapper code to customize the wrapper code for the particular application being developed. In yet another possible implementation, the user may supply the MMI wrapper code. In any of these implementations, the MMI wrapper code may include macros that may be expanded by preprocessor component 330. Accordingly, MMI generation component 340 may act as a macro generator for the MMI wrapper code. As described in more detail below, the macros, in conjunction with preprocessor component 330, may allow for an MMI wrapper in which the description of input and output signals may be parameterized, potentially allowing a user to efficiently specify input signals, output signals, and operations that are to be performed on the signals.

MMI preprocessor component 330 may receive the MMI wrapper code and expand the MMI wrapper code from MMI generation component 340 to obtain expanded MMI wrapper code. The expanded MMI wrapper code may represent compilable source code (e.g., C or C++ source code). In general, MMI preprocessor component 330 may operate based on expansion logic that may identify wrapper code portions to replace, may identify the structure of the wrapper code, and may replace the identified code portions with replacement code. The replacement code may include code designed to provide a customized external interface for the model source code. The replacement code can include code that operates on data types, data dimensions, variable names, etc. In one implementation, the expansion logic may be based on a macro language designed to make it easy for the user to modify aspects of the external interface for the model source code. However, concepts described herein to implement MMI preprocessor component 330 are not limited to a macro language. The operation of MMI preprocessor component 330 will be described in more detail below.

Figure 4:
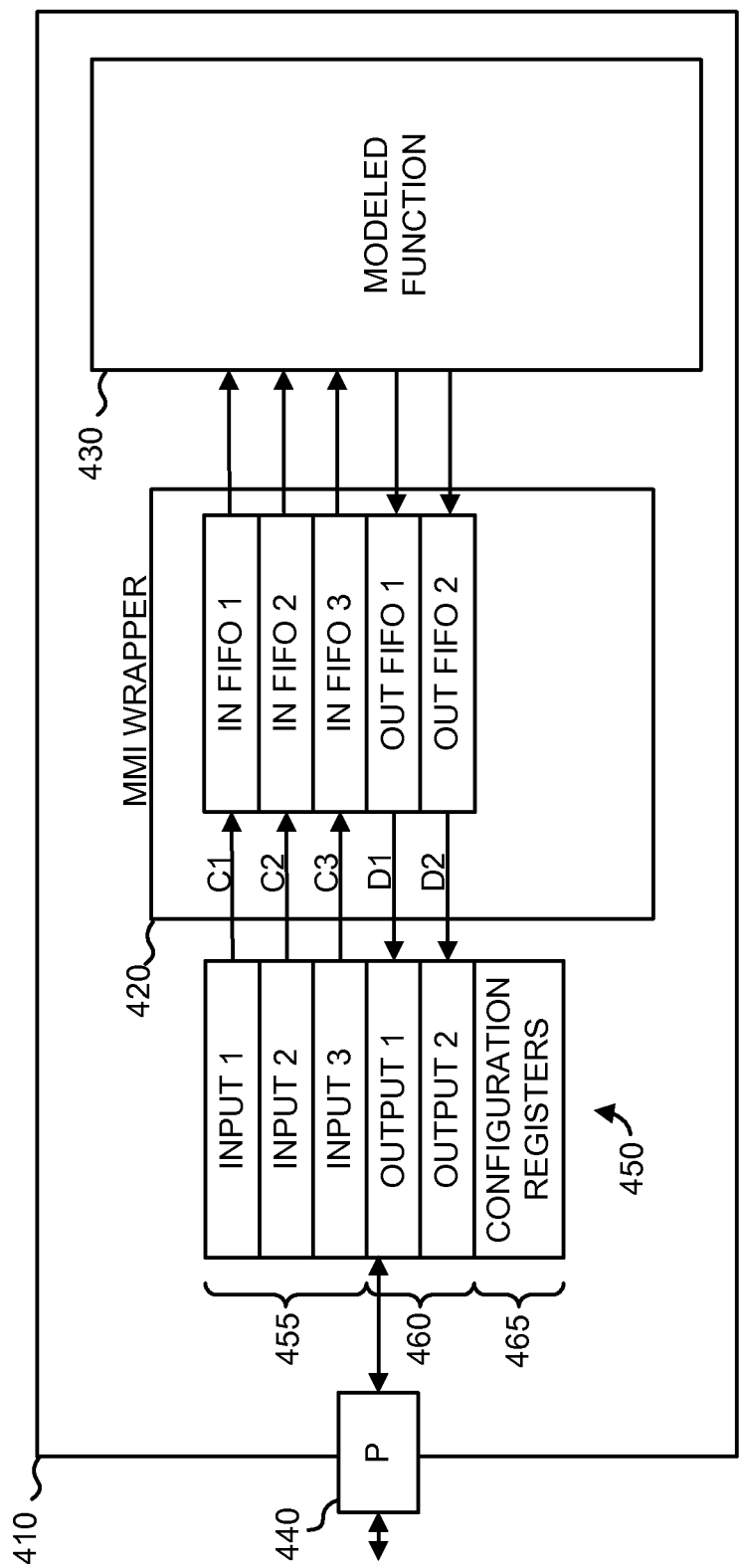
FIG. 4 is a block diagram conceptually illustrating interaction of an exemplary memory map interface wrapper and a model.

The model source code and the expanded MMI wrapper code may be compiled by compiler 350. Compiler 350 may include, for example, logic to transform C/C++ source code into an executable format for the target environment. More generally, compiler 350 may transform source code for other high level programming languages into another form, such as a binary form or an intermediate form. FIG. 4 is a block diagram conceptually illustrating interaction of an exemplary MMI wrapper and a model. In FIG. 4, system 410 may represent a system that is to be simulated in software. System 410 may include MMI wrapper 420 and modeled function 430. In the context of FIG. 3, MMI wrapper 420 may correspond to the expanded MMI wrapper code and modeled function 430 may correspond to the model source code, both potentially after being compiled by compiler 350. Additionally, a logical port 440 is shown in FIG. 4. Port 440 may represent an interface through which an external system, such as a software system that is to have its interaction with modeled function 430 verified, communicates with system 410. In one implementation, port 440 and MMI wrapper 420 may communicate through one or more memory registers 450. Registers 450 may include input registers 455, output registers 460, and configuration registers 465. Registers 450 may represent memory regions through which input and output signals are exchanged between modeled function 430 and the external system.

MMI wrapper 420 may generally act as an interface between port 440 and modeled function 430. In the example shown, MMI wrapper 420 may implement input first-in-first-out (FIFO) queues (labeled as queues IN FIFO 1, IN FIFO 2, and IN FIFO 3) and output FIFO queues (labeled as OUT FIFO 1 and OUT FIFO 2). MMI wrapper 420 may also implement callback functions (labeled as functions C1, C2, C3, D1, and D2) that may respond to read/write operations to registers 450.

In operation, data received from the external system may be stored in one of input registers 455. Data intended for the external system may be saved in output registers 460. Each input and output register may correspond to, for example, a variable or parameter in modeled function 430. Configuration registers 465 may be set by the external system to implement various configuration options for MMI wrapper 420 or modeled function 430. Callback functions C1, C2, and C3 may be called whenever a new value is written to a corresponding input register 455. Callback functions C1, C2, and C3 may generally operate to respond to data being written to input registers INPUT 1, INPUT 2, and INPUT 3, respectively, and may transfer data through the input FIFOs to modeled function 430. Callback functions D1 and D2 may be called whenever a new value is written to a corresponding output register 460. Callback functions D1 and D2 may generally operate to respond to data being read from one of the output registers and may operate to write a next value from the output FIFOs.

In general, MMI wrapper 420 may perform two fundamental tasks: (1) For each input, receive the data from appropriate ones of registers 450, reformat and/or typecast the data as necessary, and call the routines in modeled function 430 that are designed to receive the data; and (2) for each output, take data from appropriate output arguments of modeled function 430, reformat and/or typecast the data as necessary, and write the data to appropriate ones of registers 450.

In alternative implementations, MMI wrapper 420 may be implemented differently than shown in FIG. 4. For example, the FIFOs may be omitted.

Figure 5:
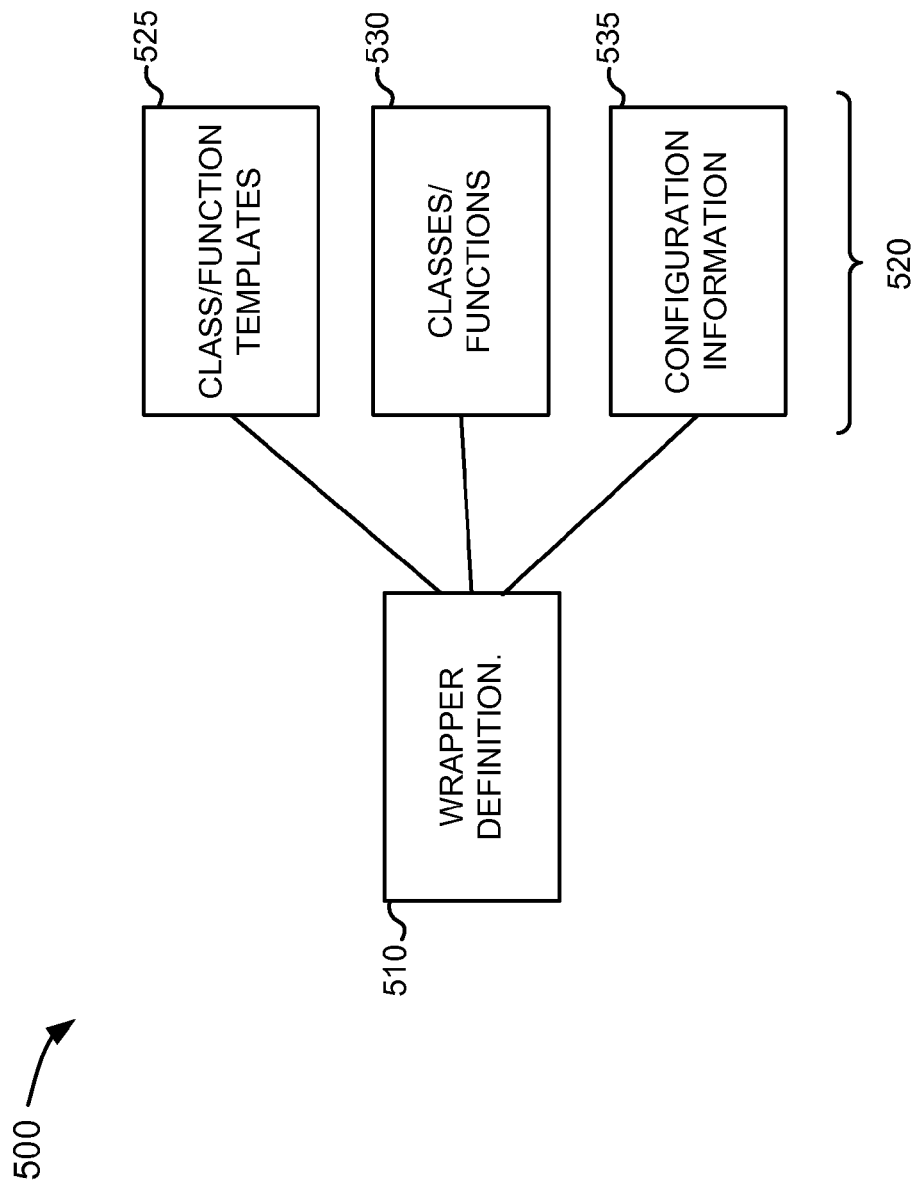
FIG. 5 is a diagram illustrating exemplary computer code components of a memory map interface wrapper.

FIG. 5 is a diagram illustrating exemplary computer code components of an MMI wrapper 420. MMI wrapper 420 may be defined by a number of components, such as files that each include computer code implementing MMI wrapper 420. MMI wrapper 420 may particularly illustrate the wrapper code before the wrapper code is expanded by MMI preprocessor 330. MMI wrapper 420 may include wrapper definition 510 and supporting components 520.

Wrapper definition 510 may include code that describes the core functionality that is to be implemented by MMI wrapper 420. Wrapper definition 510 may particularly include preprocessor macros, which will be described in more detail below. In general, a preprocessor macro may define collections of inputs, outputs, data types, and/or operations that are to be performed on the inputs and outputs using variables that can be easily edited to modify the number of inputs, outputs, data/types, and/or operations.

Supporting components 520 may include functions, classes, or other information that is referenced by wrapper definition 510. In the example shown in FIG. 5, supporting components 520 include class/function templates 525, classes/functions 530, and configuration information 535. Class/function templates 525 may include one or more template classes or functions, such as C++ template classes, that are defined to operate with generic data types. A class may generally refer to a logical object that may include data and functionality. Classes/functions 530 may include one or more classes or functions that may be referenced by wrapper definition 510. In one implementation, class/function templates 525 and classes/functions 530 may be C++ files. The class/function templates 525 and/or classes/functions 530 may operate to, for example, reformat or typecast data destined for or received from the model.

Configuration information 535 may include information used by wrapper definition 510. The configuration information may include values or types that are used in resolving macros in wrapper definition 510. In one implementation, configuration information 535 may include a C++ file defining global values for MMI wrapper 420. Configuration information 535 may additionally or alternatively be implemented as environment variables, such as environment variables in a C/C++ environment.

Table I illustrates exemplary code that may be included in an MMI wrapper in which macros are not used. In this example and the examples that follow, C++ code will be used. In alternative implementations, programming languages other than C++ may be used.

TABLE I

```
class X{
public:
    X( ) :
    obj1(foo< bar<int> > (bar<int> (int (12)))),
    obj2(foo< bar<double> > (bar<double> (double(3.45)))),
    obj3(foo< bar<char> > (bar<char> (char ('A')))),
    dummy(0) {
    // Some code
    }
template <class T> void foo_action(foo<T> h) {
    h.action( );
}
void allactions(void) {
    foo_action< bar<int> > (obj1);
    foo_action< bar<double> > (obj2);
    foo_action< bar<char> > (obj3);
}
private:
foo< bar<int> >obj1;
foo< bar<double> >obj2;
foo< bar<char> >obj3;
int dummy;
};
```

An exemplary class "X", which may be part of an MMI wrapper, is illustrated in Table I. In this class, three variables, "obj1", "obj2", and "obj3" are declared, each of which may correspond to an input signal to X. Each of obj1, obj2, and obj3 may be associated with class templates "foo" and "bar" that may facilitate book-keeping and data processing. Obj1, obj2, and obj3 are each separately declared in the MMI wrapper. Further, data types (e.g., bar<int>) and values (e.g., double(3.45)) are explicitly coded in the MMI wrapper.

Table II illustrates exemplary code that may be included in MMI wrapper 420, such as within wrapper definition 510 of MMI wrapper 420. Wrapper definition 510 may include macros consistent with aspects described herein.

TABLE II

```
class @#modelname# {
public:
    @#modelname# ( ) :
    obj@#numinputs# (foo< @#modelname#_DATATYPE@# >
(@#modelname#_DATATYPE@# (@#modelname#_INITVALUE@#))),
    dummy(0) {
    // Some code
    }
template <class T> void foo_action (foo<T> h) {
    h.action( );
}
void allactions(void) {
    foo_action< @#modelname#_DATATYPE@#numinputs# > (obj@#);
}
private:
foo< @#modelname#_DATATYPE@#numinputs# > obj@#;
int dummy;
};
```

In wrapper definition 510, as shown in Table II, instead of explicitly defining signals, data types, and values, macro expressions may be used. In the macro syntax of this example, the beginning of a macro expression may be indicated by a "@" symbol. Macro expressions may be processed on a line-by-line basis and may be of the form @#n# (where n is a positive integer) or @#string# (where string is a string variable of characters). When n is a positive integer, MMI preprocessor 330 may expand the macro to repeat the line n times and replace @#n# with 1, 2, . . . , n, in each occurrence (in an alternative implementation, other sequences can be used, such as a sequence where @#n# is replaced with 0, 1, 2 . . . n−1). All lines without the pattern @#n# may be unchanged by MMI preprocessor 330. For lines with the pattern @#n#, if there are other occurrences of @# in the same line, MMI preprocessor 330 may replace the other occurrences with 1, 2, . . . , n. For macro expressions of the form @#string#, MMI preprocessor 330 may replace the macro expression with the value of the string.

Further, in some implementations, for a macro expression of the form @#string#, string may represent a sequence of strings, such as a sequence of strings specified in an environmental variable. In this situation, the macro expression may be processed in the same way in which an integer is processed, except that instead of replacing string with a numeric sequence, strings from the string sequence may be used.

Table III illustrates exemplary content of configuration information 535 that may be associated with wrapper definition 510, as given in Table II. Configuration information 535 may include global variable definitions. "X_DATATYPE1", for example, is defined as "bar<int>". Configuration information 535 may include additional include environment variable definitions. For example, the environment variables "modelname=X" and "numinputs=3" may be defined. It can be appreciated that the environment variables may be defined, for example, for compiler 350 and may not be included in a file with the global variable definitions.

TABLE III

```
#define X_DATATYPE1 bar<int>
#define X_DATATYPE2 bar<double>
#define X_DATATYPE3 bar<char>
#define X_INITVALUE1 int(12)
#define X_INITVALUE2 double(3.45)
#define X_INITVALUE3 char('A')
#additional environmental variables:
# modelname = X
# numinputs = 3
```

MMI preprocessor 330, when expanding wrapper definition 510, as shown in Table II, and using the configuration information shown in Table III, may obtain an expanded wrapper definition identical to that shown in Table I. In contrast to wrapper definition shown in Table I, however, information, such as the number of inputs in and the type of each input in wrapper definition 510, may be specified using parameters.

As can be seen, wrapper definition 510 requires less code than the wrapper shown in Table I. Advantageously, using the preprocessor macros described herein, a user may have less code to maintain. Additionally, because data types and values, such as bar<int> and double(3.45) are taken out of wrapper definition 510, the user may concentrate on implementing wrapper definition 510 to describe the structure/form of MMI wrapper 500. If the number of inputs is changed, then wrapper definition 510 can remain the same and only configuration information 535 may be changed. Wrapper definition 510 may be more readable to a user as compared to a wrapper that does not use the preprocessor macros described herein. Further, when users want to change the form of MMI wrapper 420, the user may edit wrapper definition 510 or class/function templates 525 or classes/functions 530, which may be primarily written in the programming language used for the system simulation, allowing the user to focus more on the form of the wrapper and functionalities required for all input/output signals rather than dealing with tedious details (e.g. related to data types) of individual input/output signals.

In wrapper definition 510, as shown in Table II, a single macro line can be used, in conjunction with the environment variables used to expand the macro language, to define operations for multiple input/output signals, even when the operations performed on the signals are not identical. In strongly typed programming languages, such as C++, this may not normally be possible as structures, such as arrays, may be limited to storing homogeneous elements. The preprocessor macros described herein may thus be particularly applicable to MMI wrappers expressed using a strong typed programming language that does not support heterogeneous arrays of elements.

As another example of the operation of MMI preprocessor in expanding wrapper definition 510, consider the following two lines of wrapper definition code:

DATATYPE@#3# myvar@#[SIZE@#];
template_function<DATATYPE@#3#, SIZE@#>(myvar@#);

Using the above-described techniques for expanding the preprocessor macros, these two lines may be expanded to:

DATATYPE1 myvar1[SIZE1];
DATATYPE2 myvar2[SIZE2];
DATATYPE3 myvar3[SIZE3];
template_function<DATATYPE1, SIZE1>(myvar1);
template_function<DATATYPE2, SIZE2>(myvar2);

template_function<DATATYPE3, SIZE3>(myvar3);
Additionally, assume that the following environment variables are defined:
   modelname="FOO";
   numinputs=3;
   portnames={"POS", "SPEED", "ACC"};
and assume the following two lines are to be expanded:
   @#modelname#_DATATYPE@#numinputs#  myvar@#[SIZE@#];
   @#modelname#_INIT_@#portnames#(CONST_@#, OPTION_@#);
The expanded form may be:
   FOO_DATATYPE1 myvar1[SIZE1];
   FOO_DATATYPE2 myvar2[SIZE2];
   FOO_DATATYPE3 myvar3[SIZE3];
   FOO_INIT_POS(CONST_POS, OPTION_POS);
   FOO_INIT_SPEED(CONST_SPEED, OPTION_SPEED);
   FOO_INIT_ACC(CONST_ACC, OPTION_ACC);

Preprocessor macros, as described above, may additionally be used in defining multiple similar functions. Assume that the modeled system includes four input signals, each of which uses a helper function to process an input signal and the processing performed by the helper functions depend on the data type of the input signal. A C++ macro may be used to define an entry point of the helper function for a particular input and the preprocessor macros described herein may be used to iterate over all inputs in a single line. The code shown in Table IV illustrates this technique.

TABLE IV

```
// X_globals.h
#define DATATYPE0 int
#define DATATYPE1 double
#define DATATYPE2 char
#define DATATYPE3 short
// X.cpp
#include "X_globals.h"
#define X_DEFINE_HELPERFUNC(n) \
    DATATYPE ## n helperfunc_entry ## n(DATATYPE ## n arg) \
    { return helperfunc<DATATYPE ## n> (arg); }
class X
{
public:
    X( )
    {
        // Some code
    }
    template <class T> T helperfunc (T arg);
    X_DEFINE_HELPERFUNC (@#numinputs#);
private:
    // Some code
};
template <class T> T X: :helperfunc(T arg)
{
    // Some code
    return arg;
}
```

In example shown in Table IV, the environment variable "numinputs" may be set to four. A preprocessor macro, "X_DEFINE_HELPERFUNC(@#numinputs#)", may be used to easily define the methods "helperfunc_entry0", "helperfunc_entry1", "helperfunc_entry2", and "helperfunc_entry3" in one line. When the user would like to change the number of input signals, only the environment variable "numinputs", and possibly a global variable configuration file similar to the one shown in Table III, may need to be changed.

It can be appreciated that the specific expansion rules defined above for expanding the macros in wrapper definition 510 are exemplary. Other expansion rules could be used.

Figure 6:
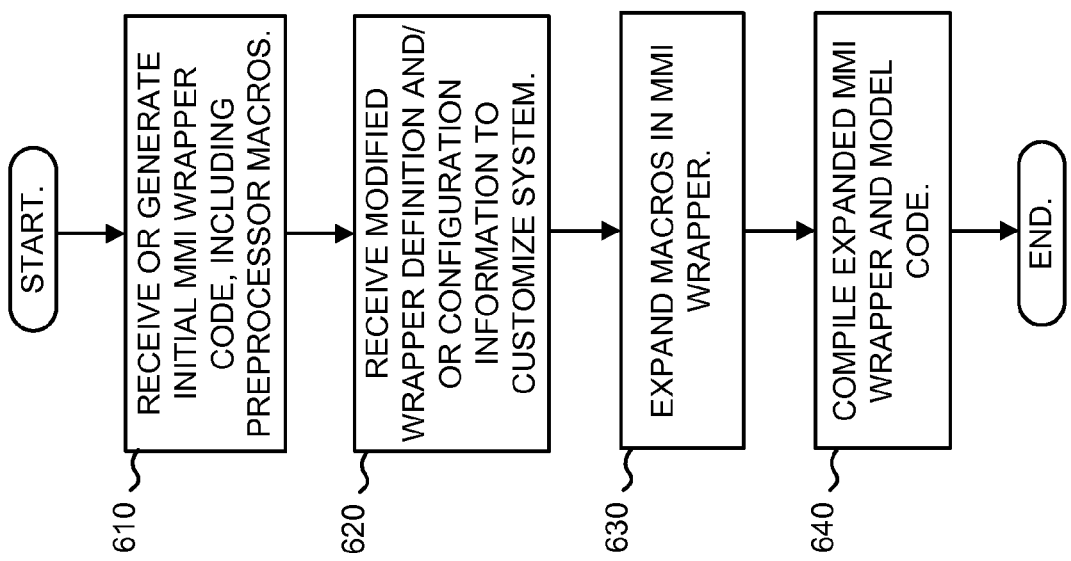
FIG. 6 is a flow chart illustrating exemplary operations for using preprocessor macros to generate a model of a system.

FIG. 6 is a flow chart illustrating exemplary operations for using preprocessor macros to generate a model of a system. The operations described in FIG. 6 may be performed by, for example, TCE 120 and compiler 350.

MMI wrapper code may be initially received from the user or generated by TCE 120 (block 610). In one implementation, TCE 120 may be provided to end-users with exemplary samples of MMI wrapper code. The user may choose the sample that includes the functionality that most closely matches the functionality needed for the system being designed by the user. In alternative implementations, TCE 120 may automatically generate MMI wrapper code based on, options selected by the user. In yet another possible implementation, the MMI wrapper code may be supplied by the user. In each of these implementations, one or more components of the MMI wrapper, such as wrapper definition 510, may include preprocessor macros, as described above (block 610).

The user may customize or modify the MMI wrapper by modifying wrapper definition 510 or modifying configuration information 535 (block 620). For example, as described above, by modifying global variables or environment variables, the user may easily change the number of input/output signals, the data types associated with these signals, or the operations associated with these signals.

At some point, the user may be ready to test or verify the model source code, using the MMI wrapper as an interface for the input/outputs to the model algorithms. MMI preprocessor 330 may expand the preprocessor macros in the MMI wrapper (block 630). MMI preprocessor 330 may particularly expand the macros in wrapper definition 510. The expansion may be performed on a line-by-line basis using the macro operations described previously.

The expanded version of the MMI wrapper, along with the model source code, may be compiled by compiler 350 (block 640). Compiler 350 may be a compiler designed to output compiled code that can be run on the target device at which the model is to be tested.

Although the exemplary operations describe with respect to FIG. 6 were described in which the initial MMI wrapper code includes preprocessor macros, in some alternative implementations, other techniques for customizing the MMI wrapper code may be used. For example, MMI wrapper options interface 345 may present a graphical interface to the user through which the user may enter any options or parameters needed to customize the MMI wrapper code. MMI generation component 340 and memory wrap interface preprocessor may then automatically generate in one step (from the point of view of the user), the expanded MMI wrapper code. In such an implementation, the MMI wrapper code may be implemented using, for example, SystemC code and a transaction-level modeling (TLM) approach. TLM is a high-level approach to modeling digital systems where details of communication among modules are separated from the details of the implementation of functional units or of the communication architecture. Under TLM, communication mechanisms such as busses or FIFOs may be modeled as channels using SystemC interface classes. SystemC generally refers to a set of C++ classes and macros which may provide an event-driven simulation kernel in C++.

CONCLUSION

Preprocessor macros, as described above, may be used to enhance the definition of memory map wrappers that provide an interface between a modeled system that is to be simulated and an external system with which the modeled system is to communicate.

The foregoing description of implementations provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 6, the order of the acts may be modified in other implementations. Further, non-dependent acts may be performed in parallel.

Also, the term "user" has been used herein. The term "user" is intended to be broadly interpreted to include, for example, a workstation or a user of a workstation.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A system comprising:
one or more processors to:
store an initial wrapper code, the initial wrapper code including macros;
receive information associated with a model,
the model, when executed:
receiving a first plurality of signals,
outputting a second plurality of signals, and
being implemented using source code;
generate, based on the initial wrapper code and the information associated with the model, a memory map wrapper code,
the one or more processors, when generating the memory map wrapper code, being further to:
identify parameters associated with the source code,
determine, based on the parameters, a structure identifying one or more macros, of the macros, that can be used to configure the parameters,
identify memory locations storing respective data associated with the first plurality of signals and the second plurality of signals, and
form the memory map wrapper code to include:
a source code section associated with a mapping between the memory locations and the source code, and
configuration information for the one or more macros to define the mapping; and
expand the one or more macros in the memory map wrapper code based on the parameters to form an expanded memory map wrapper code.

2. The system of claim 1, where the one or more processors are further to:
generate the macros using a transaction-level modeling (TLM) language.

3. The system of claim 2, where the TLM language includes SystemC code.

4. The system of claim 1, where the one or more processors are further to:
provide a modeling environment to form the model, and
where the one or more processors are further to:
generate the macros based on parameters received from a user via the modeling environment.

5. The system of claim 4, where the modeling environment includes a graphical modeling environment.

6. The system of claim 4, where the modeling environment is a text-based modeling environment.

7. The system of claim 1, where the one or more processors are further to:
compile the expanded memory map wrapper code and the source code, implementing the model, to obtain an executable version of the model.

8. The system of claim 1,
where the source code section further includes:
information associated with a mapping the memory locations and variables associated with the source code.

9. The system of claim 1, where the one or more processors, when generating the memory map wrapper code, are further to:
define, using the configuration information, operations associated with the first plurality of signals and second plurality of signals, and
generate the memory map wrapper code further based on the defined operations.

10. The system of claim 9, where configuration information relates to at least one of:
data types associated with the parameters,
initial variable values associated with the parameters, or
constant values associated with the parameters.

11. The system of claim 1, where the one or more processors, when expanding the one or more macros, are further to:
parse the source code section to identify a portion related to one or more of the parameters; and
expand, based on the configuration information, the portion to form multiple different portions associated with the one or more of the parameters.

12. The system of claim 1, where the parameters specify one or more of:
a quantity of the first plurality of signals and the second plurality of signals,
a function of a signal, of the first plurality of signals or the second plurality of signals,
a configuration associated with the signal, or
a data type associated with the signal.

13. The system of claim 1, where the one or more processors are further to:
use the expanded memory map wrapper to reformat and typecast data associated with the model.

14. A method comprising:
receiving, by one or more processors of a computer, a model of a design,
the model:
receiving a first plurality of signals,
outputting a second plurality of signals, and
being associated with source code;
receiving, by the one or more processors, interface code interfacing the source code and the first plurality of signals and the second plurality of signals,
the interface code including:
a first section that includes one or more functions used by the interface code,
a second section that includes macros mapping the one or more functions in the first section to the first plurality of signals and the second plurality of signals, and
a third section identifying configuration information associated with expanding the second section;
expanding, by the one or more processors, one or more macros, of the macros in the second section, based on the configuration information, the first plurality of signals, and the second plurality of signals, to form expanded interface code,
expanding the one or more macros including:
identifying parameters associated with the source code,
determining, based on the parameters, a structure identifying, as the one or more macros, a set of the macros to configure the parameters,
expanding the one or more macros based on the parameters and the structure; and
compiling, by the one or more processors, the source code and the expanded interface code to obtain an executable version of the model.

15. The method of claim 14, where the configuration information in the third section includes one or more of:
configuration information relating to data types associated with the parameters,
initial variable values associated with the parameters, or
constant values associated with the parameters.

16. The method of claim 14, where expanding the macros includes:
parsing each of a plurality of portions of code included in the second section; and
expanding at least one portion, of the plurality of portions in the second section, into multiple lines of code.

17. The method of claim 14, where the interface code implements a memory map wrapper for the source code.

18. The method of claim 17, where the memory map wrapper is used to reformat and typecast data associated with the model.

19. The method of claim 17, where the third section includes:
the configuration information, or
information identifying a storage location associated with the configuration information.

20. The method of claim 14, where the macros includes a transaction-level modeling (TLM) language.

21. The method of claim 20, where the TLM language includes SystemC code.

22. One or more non-transitory computer-readable media storing instructions, the instructions comprising:
one or more instructions that, when executed by a processor, cause the processor to:
receive information associated with a model,
the model receiving a first plurality of signals and outputting a second plurality of signals, and
the model being implemented using source code;
generate, based on the source code, memory map wrapper code,
the one or more instructions to generate the memory map wrapper code including:
one or more instructions to:
identify one or more parameters associated with the source code,
determine, based on the one or more parameters, a structure identifying one or more macros, of the macros for configuring the one or more parameters,
identify memory regions storing respective data associated with the first plurality of signals and the second plurality of signals, and
include in the memory map wrapper code:
a source code section associated with a mapping between memory regions and the source code, and
configuration information for one or more macros to define the mapping; and
expand the one or more macros in the memory map wrapper code based on the one or more parameters to obtain an expanded memory map wrapper code.

23. The one or more non-transitory computer-readable media of claim 22, further comprising:
one or more instructions that, when executed by a processor, cause the processor to compile the expanded memory map wrapper code and the source code to obtain an executable version of the model.

24. The one or more non-transitory computer-readable media of claim 22, where the source code further includes:
a mapping from the memory regions and variables associated with the source code.

25. The one or more non-transitory computer-readable media of claim 24, where the macros define operations associated with the first plurality of signals and the second plurality of signals.

26. The one or more non-transitory computer-readable media of claim 22, where the one or more parameters specify one or more of:
a quantity of the first plurality of signals and the second plurality of signals,
a function of a signal, of the plurality of signals or the second plurality of signals,
a configuration associated with the signal, or
a data type associated with the signal.

27. The one or more non-transitory computer-readable media of claim 22, where the memory map wrapper code include transaction-level modeling (TLM) language.

28. The one or more non-transitory computer-readable media of claim 22, where the expanded memory map wrapper is used to reformat and typecast data associated with the model.

29. The method of claim 14, further comprising:
receiving one or more user inputs;
modifying the configuration information, in the third section of the interface code, based on the one or more user inputs; and
updating the executable version of the model based on the modified configuration information.

30. The one or more non-transitory computer-readable media of claim 22, where the instructions further comprise:
one or more instructions that, when executed by a processor, cause the processor to:
receive one or more user inputs;
modify the configuration information based on the one or more user inputs; and
update the expanded memory map wrapper code based on the modified configuration information.

* * * * *